United States Patent [19]

Gale

[11] 3,742,239

[45] June 26, 1973

[54] DISCRIMINATING DEVICES

[75] Inventor: Frederick Henry Gale, Hillingdon, England

[73] Assignee: EMI Limited, Hayes, Middlesex, England

[22] Filed: June 6, 1961

[21] Appl. No.: 115,593

[30] Foreign Application Priority Data

June 9, 1960 Great Britain .................. 20,401/60

[52] U.S. Cl. ..........250/349, 102/70.2 P, 244/14

[51] Int. Cl. ............................................ H01j 39/00

[58] Field of Search ............ 250/83.3, 203, 83.3 IR; 244/14.3, 14.4; 315/10, 139 TV; 102/70.2 P; 88/1

[56] References Cited

UNITED STATES PATENTS

| | | | |
|---|---|---|---|
| 2,423,885 | 7/1947 | Hammond | 244/14.3 |
| 2,820,167 | 1/1958 | Schroeder | 315/10 |
| 2,892,949 | 6/1959 | Hardy | 244/14.3 |
| 2,953,688 | 9/1960 | Maxwell | 250/83.3 IR |
| 2,070,178 | 2/1937 | Pottenger et al. | 250/203 X |
| 3,067,283 | 12/1962 | Petritz et al. | 250/83.3 IR |

*Primary Examiner*—Reuben Epstein
*Attorney*—Fleit, Gipple & Jacobson

EXEMPLARY CLAIM

1. A target discriminating device comprising a plurality of radiation sensitive elements distributed in rows and columns over an image area, means for condensing incident radiation to form an image on said area, a plurality of row conductors corresponding to the rows of said sensitive elements, a plurality of column conductors corresponding to the columns of said sensitive elements, the row conductors being coupled to the column conductors by the sensitive elements in the respective rows and columns, means for sequentially sampling said column conductors to cause a signal to appear selectively in the row conductors in dependence upon the excitation of the said sensitive elements, an output channel common to said row conductors, coupling means including isolating two-state devices, one for each row conductor, arranged to pass a signal from the respective row conductor to the output channel once only within a predetermined time interval and means for additionally applying a signal to said output channel at each sampling instant, other than via the row conductors, in response to excitation of any sensitive element in the respective column, said output channel including means for generating an output signal only in response to a plural number of successively applied discrete signals within said time interval.

2 Claims, 8 Drawing Figures

DISCRIMINATING DEVICES

Figure 1A:
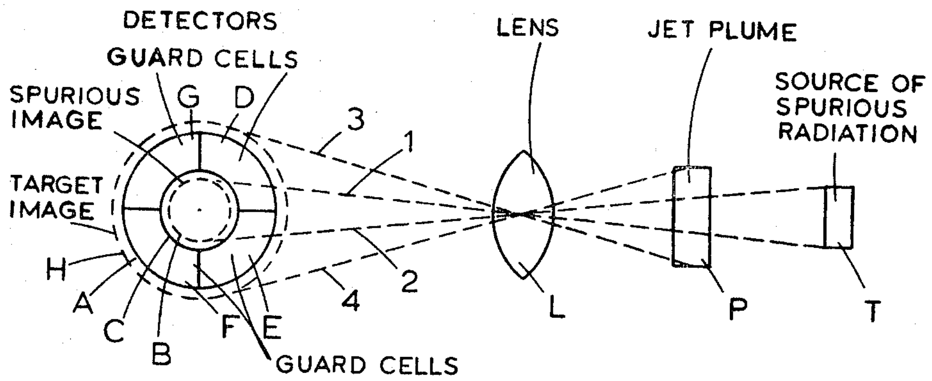

This invention relates to target discriminating devices and relates especially though not exclusively to infrared fuse devices for discriminating between radiation received from a prescribed target and radiation received from sources other than a prescribed target.

In fuze devices such as may be incorporated in missiles which are detonated in response to radiation from the jet effluxes of a target aircraft or projectile, it has been proposed to provide means whereby the missile may be protected against spurious firing resulting from detection of energy received from sources other than a prescribed target. Thus, it has been proposed to utilize differing absorbtion properties of the paths in the atmosphere between the missile and sources other than the prescribed target, and between the missile and a prescribed target. Alternatively, it has been proposed to discriminate between spurious radiation received from a source other than a prescribed target and radiation received from a prescribed target on the basis of the difference in range between such a source of spurious radiation and a prescribed target. However, such prior proposals suffer from various limitations, with the result that the presence of a prescribed target in the vicinity of a missile does not necessarily trigger the fuze when spurious radiation emanating from sources other than the prescribed target is also present.

The object of the present invention is to provide an improved arrangement for discriminating between energy received from a prescribed target and energy radiated from a source other than such a target.

According to the present invention there is provided a target discriminating device comprising radiation detecting means, means for condensing incident radiation on said detector and means for providing a predetermined output signal only when the incident radiation affects an area of said detector within prescribed limits of size and within a predetermined time or times.

A further aspect of the invention utilizes the fact that the image formed by radiation received from a source of radiation which is separated from the missile by a very large distance, and therefore does not constitute a proper target, is one of substantially constant size, whilst the image formed by radiation received from a proper target is one that increases rapidly as the missile approaches the close proximity of the target. Thus the presence of radiation received from a proper target may be evidenced by the rate at which the separate elemental areas of the detector become excited exceeding a predetermined rate.

An advantage which is common to both aspects of the invention is that the fuzing system of a missile incorporating a radiation detector according to the present invention fires at a target in its proximity even in the presence of spurious radiation received from the sources other than the target.

Figure 1B:
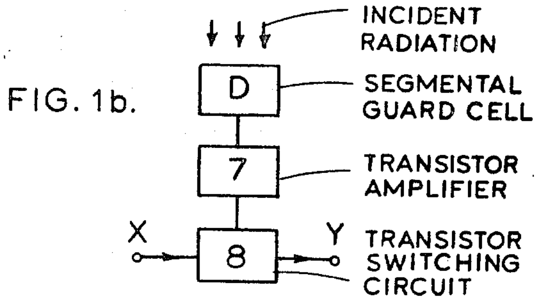
Figure 1C:
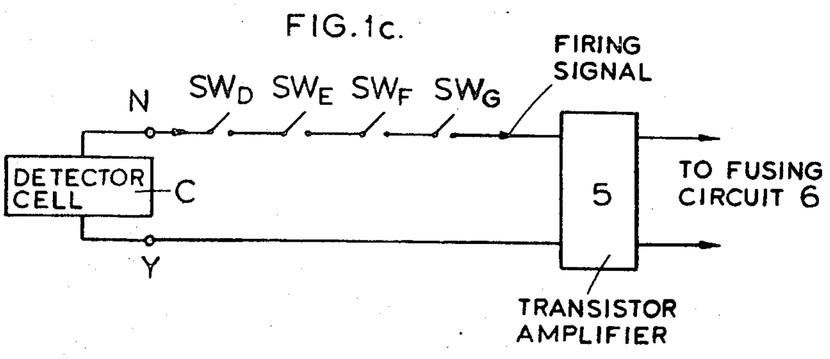
Figure 2:
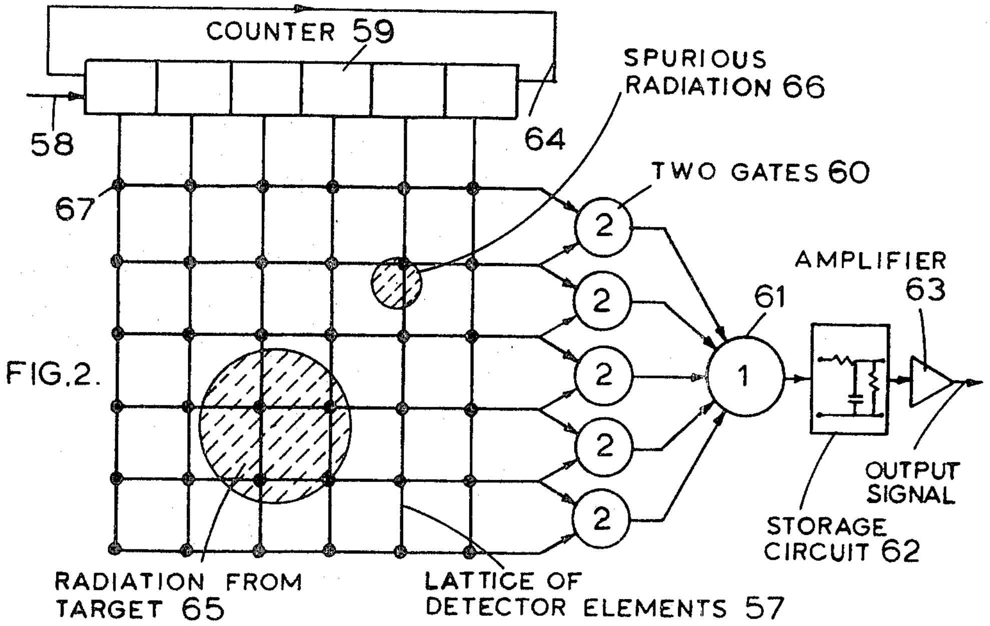
Figure 3:
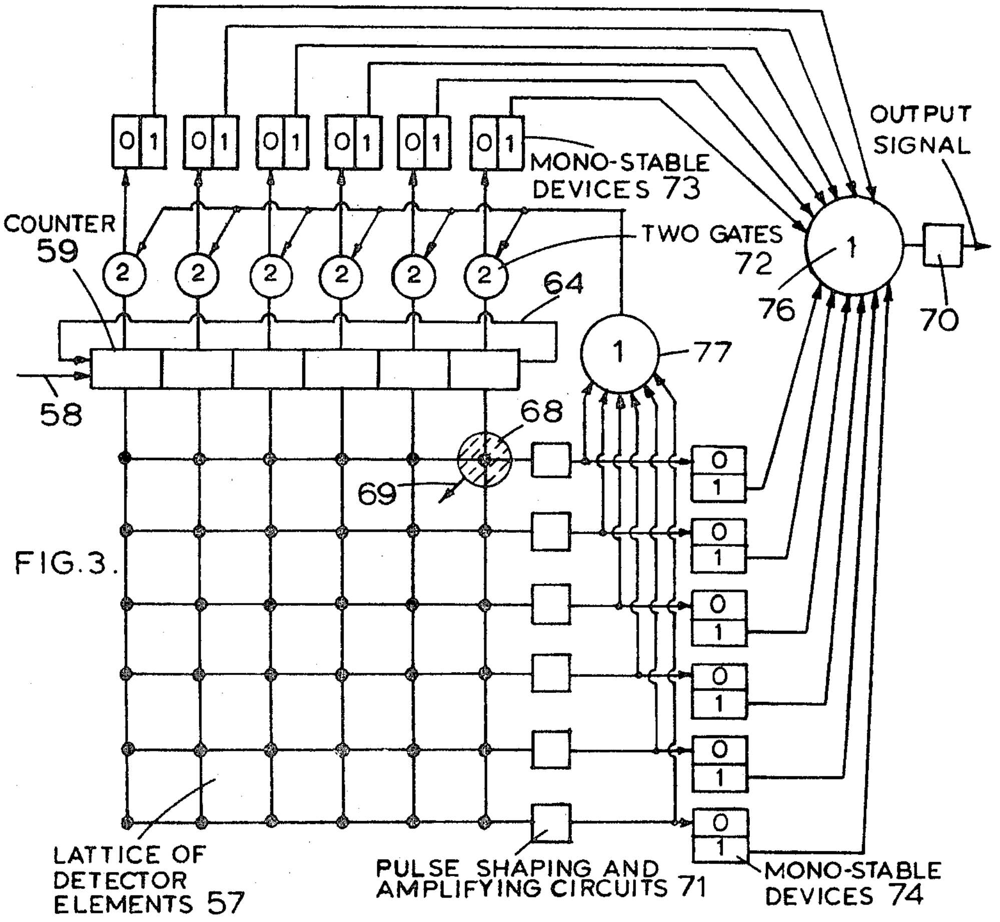
Figure 4:
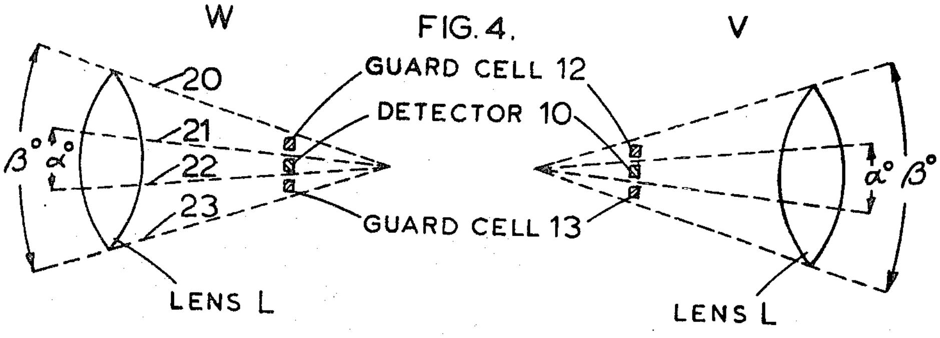
Figures 5, 6:
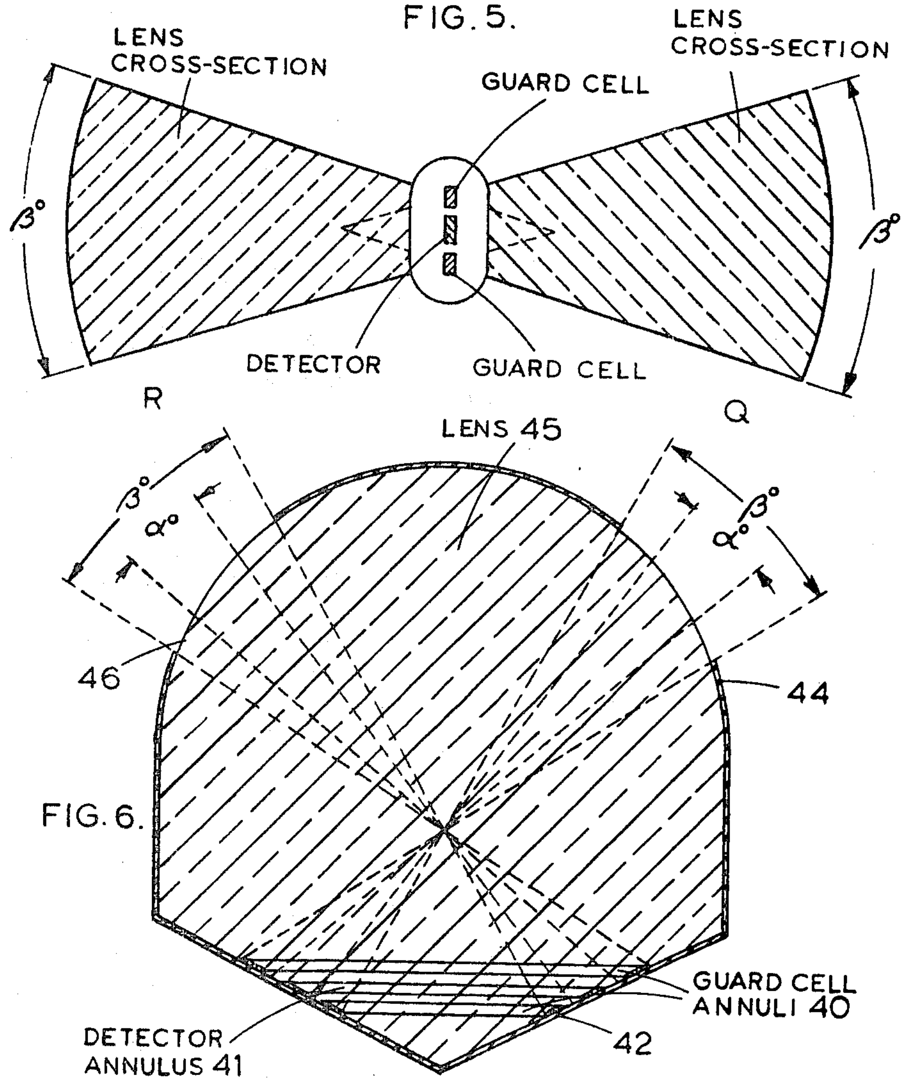

In order that the present invention may be clearly understood and readily carried into effect, it will now be described with reference to the accompanying drawings, in which:

FIG. 1, which comprises FIGS. 1*a*, 1*b* and 1*c*, illustrates a target discriminator according to one example of the present invention, FIG. 1*a* illustrating the radiation detector of the device, and FIGS. 1*b* and 1*c* illustrating schematically the operating circuit associated with such a detector, FIG. 2 illustrates a target discriminator according to another example of the present invention in which discrimination is effected on the basis of image size, FIG. 3 illustrates a target discriminator according to a further example of the invention, in which discrimination is effected on the basis of image movement, and FIGS. 4, 5 and 6 illustrate respectively further examples of radiation detectors which can be used in devices according to the present invention.

FIG. 1 illustrates an arrangement for providing a radiation detector with means for discriminating between radiation received from sources other than a proper target and radiation received from a proper target. The arrangement provides means for inhibiting the fuzing signal which tends to be produced by spurious radiation received from targets other than a proper target and yet to allow the production of a fuzing signal when spurious radiation and radiation from a proper target are both influencing the detecting device simultaneously. In the example illustrated in FIG. 1a, the surface of the detector is shown schematically by the reference A, and the central portion shown by the reference B represents that area of the surface of the detector which receives incident radiation from a distant source of spurious radiation. It will be understood that this radiation is approximately focussed, or condensed, onto the surface of the detector by a lens L and by virtue of the distance separating the detector and the source of spurious radiation, the radiation received from such a distant source is incident on a smaller area of the detector surface than is radiation received from a proper target situated in the immediate vicinity of the detector. Reference to FIG. 1*a* shows that the surface of the detector is divided into five separate areas, in the example of the invention shown in FIG. 1a the central portion of the detector, shown by the reference C, extends slightly beyond the extremities of the area which receives spurious radiation. Surrounding the central portion of the detector are four segmental portions shown respectively by the references D, E, F and G. Each of these outer areas represents an independent cell or group of cells sensitive to incident radiation. Due to its closer proximity the radiation received from a proper target, after being condensed onto the area occupied by the detector, produces an image on the surface of the detector which grows rapidly in area as the distance separating the detector and the target diminishes and eventually encloses all the separate areas D, E, F and G of the detector within its boundaries. In FIG. 1*a* the area of the detector which receives incident radiation from the proper target is enclosed within the circle shown by the reference H and in these circumstances radiation from a proper target will excite simultaneously all of the five areas of the detector D, E, F, G and C. In this example of the invention it has been assumed that only an image formed by condensing radiation received from a proper target can cover all cells of the detector simultaneously, the radiation received from distant objects other than the target such as represented by T forms, after condensation, an image on the surface of the detector which is insufficiently large to excite all the separate sections of the detector simultaneously. Thus the portions of the detector, which may be individual cells, shown schematically in FIG. 1a by the areas D, E, F and G form a segmental guard ring of detectors arranged around the central detector. According to this example of the invention, the signal provided by these guard cells is arranged to operate switches which are connected in series, and the arrangement is such that the fuze will not fire until all the switches are closed. The circuit arrangement is shown in FIG. 1c the switches operated by the signals provided by the individual guard cells being denoted by the references $SW_D$, $SW_E$, $SW_F$ and $SW_G$. The individual detectors according to this example of the invention are thermo-voltaic cells which can provide an electric current in an appropriate external circuit in response to incident radiation. One of the segmental guard cells, say the cell D, and its associated output circuit is shown schematically in FIG. 1*b*. The cell D is associated with a transistor amplifier 7, which amplifies the output current from the detector cell D. The output of each of the transistor amplifiers corresponding to the respective detector cells is applied to a transistor switching circuit 8. This switching circuit 8 is represented by the switch $SW_D$ in FIG. 1*c*. The construction of the individual units shown by the references D, 7 and 8 in FIG. 1b will not be described in detail since they are each of known type. Each detector cell is of the indium antimonide emissive type and the transistor amplifiers such as that shown by the reference 7 are of conventional design. The output current of the detector cells provides the base input, or drive, current for the associated transistor amplifier. The switching circuit 8 comprises a transistor whose collector emitter impedance is reduced by the presence of a base input current so that current can flow in the collector circuit to provide a conducting path between the terminal X and Y. Other arrangements may however be used for the units such as D, 7 and 8. The result of radiation simultaneously incident on the segment guard cells D, E, F and G is to cause a circuit to be completed to a transistor amplifier 5, FIG. 1*c*. When the latter receives an input signal exceeding a predetermined threshold, a signal is applied to a fuzing circuit 6. As shown in FIG. 1c, the switches $SW_D$, $SW_E$, $SW_F$ and $SW_G$ are connected in series with one another and also with the central detector C. Therefore current from the detector C, which is produced in response to the combined effect of spurious radiation and radiation received from a proper target, can only be applied to the input of the transistor amplifier 5 when all the guard cell switching circuits $SW_D$, $SW_E$, $SW_F$ and $SW_G$ have been closed. Thus, current can only flow in the fuzing circuit when the criteria for fuzing is satisfied. As explained above this criteria can only be satisfied when the target image satisfies the condition that it excites all the cells of the detector simultaneously.

In an alternative example of the invention the central detector cell C is dispensed with and a source of fixed potential is applied to the terminals NY in FIG. 1*c*. The current from such a source of fixed potential flows in the fuzing circuit 6 when the criteria for fuzing is satisfied.

FIG. 2 illustrates a further example of a radiation detector, this arrangement comprises a lattice of horizontal and vertical conductors which are connected together at the cross-over points by individual cells or groups of cells which are sensitive to radiation incident upon them. The cells are represented by dots and one such is denoted by reference 67. In FIG. 2 the shaded outline 66 shows the area of the lattice which is subjected to incident radiation from a source other than the target whilst a target image is shown by the reference 65. It is seen that the area occupied by the spurious image 66 is insufficiently large to excite more than one cell simultaneously whilst the target image is sufficiently large to excite simultaneously a plurality of individual detector cells. Clearly, the spacing of the detector cells in the arrangement shown in FIG. 2 may be adjusted in order to discriminate, in the manner indicated above, between radiation from a proper target and spurious radiation provided that there is a significant difference in size between the two radiation images produced. It is to be understood that when a cell is excited, a voltage of a predetermined polarity is induced between the vertical and horizontal conductors joined by that cell. A counter 59 provides means for sequentially sampling the cells to detect excited cells. The counter 59 may be of a kind well known to those skilled in the art and is merely shown in block form in FIG. 2, the conductor 58 indicating the path by which reference timing pulses are applied to the counter and the conductor 64 is a feedback path between the first and last stages of the counter, so that the operation of the counter is cyclic in response to a continuous sequence of timing pulses applied via 58. Thus voltage pulses are applied cyclically in order to the vertical conductors of the lattice. When a voltage pulse is applied to one of the vertical conductors by the counter 59, that pulse is applied to all the horizontal conductors, and if any of the cells 67 is excited the voltage pulse is superimposed, on the respective horizontal conductor, on the voltage due to the excitation of the cell. The voltage on each of the horizontal conductors of the lattice is applied to one port of a two gate 60, the other port of the corresponding two gate receiving the voltage on the adjacent horizontal conductor in the manner shown in FIG. 2. The threshold of the gates is adjusted so that a gate will produce an output signal in response only to a voltage pulse from the counter when that pulse, as applied to the respective two horizontal conductors, is superimposed on the voltages caused by the simultaneous excitation of the two cells coupling the vertical conductor and the two horizontal conductors. An output signal from a gate 60 is applied via a buffer to an integrating circuit 62 and an amplifier 63, the output signal derived from the amplifier 63 may be applied to a subsequent fuzing circuit which is not shown in the drawing since it forms no part of the invention, as such. Reference to FIG. 2 shows that the radiation received from a proper target and projected onto the lattice of detector cells 57, occupies a sufficiently large area to excite cells at the four cross-over points of two adjacent vertical conductors and the two adjacent horizontal conductors. Thus two successive outputs from the counter 59 will produce output signals from the corresponding one of the gates 60 and consequently two outputs will be derived from the gate 61 and applied to a storage circuit 62 which has a short rise time and long run-down time. This storage circuit 62 prepares a signal proportional to the sum of the individual pulses received from the gate 61 if they follow at the repetition frequency of the pulses applied via 58, and the amplifier 63 incorporates a threshold circuit which is so arranged that a signal is produced by the amplifier 63 if the sum output of the circuit 62 corresponds to that produced by a predetermined number of successive pulses from the gate 61, said number being two in the example described, though obviously the discrimination could be increased by increasing the said number. In one limiting case, the arrangement may be such as to provide an output signal in response to only a single output pulse from the gate 61, which corresponds to the condition when only two vertically adjacent detector cells are simultaneously excited, in which case the circuit 62 may be dispensed with. Thus, the radiation detector formed by an arrangement of detector cells located at the cross-over points of the lattice of horizontal and vertical conductors may be arranged to discriminate between spurious radiation and radiation received from a proper target on the basis of the differing sizes of the two radiation images produced, and the spacing of the detector cells in the lattice arrangement together with the threshold of a circuit associated with the integrating circuit 62 can be so adjusted that an output signal is only produced when the radiation image projected on the lattice exceeds a predetermined size.

A lattice arrangement of detector cells similar to that shown in FIG. 2, is shown by the reference 57 in FIG. 3. The example of the invention shown in FIG. 3 is similar to that shown in FIG. 2, but is arranged to discriminate between spurious radiation and radiation received from a proper target on the basis of the relative rates at which the target image and spurious image increase in size or traverse the lattice. As has been previously indicated, a proper target will usually be much closer to the radiation detecting device than will a source of spurious radiation. Consequently, the image produced by the former will rapidly increase in size as the distance between the radiation detecting device and the proper target diminishes, whereas the image produced by spurious radiation will be one of substantially constant size. Also, in view of the relative distance between the radiation detector and the proper target on the one hand and between the radiation detector and a source of spurious radiation on the other hand, the image produced by a proper target will tend to traverse the surface of the lattice at a rate which is distinguishable from that at which the image produced by a distant source of spurious radiation traverses its surface. In the FIG. 3 arrangement, as in that illustrated in FIG. 2, a counter 59 samples sequentially the vertical conductors forming the lattice. The time taken to sample all the vertical conductors of the lattice will be referred to as the sampling period and the time interval which occurs between sampling of adjacent vertical conductors within a single sampling period will be referred to as the sampling interval. An image produced by radiation incident on the lattice is shown in FIG. 3 by the reference 68. On applying a sampling pulse from the counter 59 to the vertical conductor located at the extreme right-hand side of the lattice 57, an output pulse above a given threshold will be derived since the radiation, shown by the circular image 68, is incident on the detector cell located at the intersection of the first horizontal and first vertical conductor of the lattice. This output will be applied to one of the pulse shaping and amplifying circuits 71 and subsequently to the corresponding one of the series of mono-stable devices or flip-flop 74. The construction of these devices 74 will not be described in detail since such devices are well known to those skilled in the art, these devices have a stable state which will be referred to as the 0 state and an unstable state which will be referred to as the 1 state. As indicated by the conventional symbolism used in FIG. 3, a signal derived from any of the horizontal conductors forming the lattice 57 will result in the corresponding one of the two state devices 74 being set in its 1 state. In consequence of this change of state, an output is derived from the corresponding one of the two state devices 74 which is applied to the gate 76. As shown in FIG. 3, the output derived from any of the pulse-shaping and amplifying circuits 71 is also applied to the gate 77, an input to any of the ports of this gate 77 will result in a gating signal being applied to one port of each of the two gates 72. In these circumstances, an output is derived from the corresponding vertical conductor of the lattice 57. This output is applied to the corresponding one of the devices 73. If the radiation image 68 is produced by spurious radiation emanating from a distant source, an output is derived from the first one of the horizontal conductors forming the lattice and this output will result in the corresponding one of the two state devices 74 being set in its 1 state. Consequently, a signal will be applied to the gate 76 and hence to a pulse frequency discriminator 70. A simultaneous output is also derived from the device 73 corresponding to the extreme right-hand vertical conductor. In one embodiment of the invention, this device 70 is a counter which is arranged to count the pulses derived from the gate 76 and to provide an output signal when a predetermined number of such signals from the gate 76 have been counted. Since it has been assumed that the area 68 represents the spurious radiation image it is assumed to be stationary or moving only through a small arc in one period of the counter 59, consequently no further outputs will be derived as a result of sampling the other conductors in the lattice. On repeating the initial sampling sequence a signal will again be derived from the first horizontal and vertical conductors of the lattice 57. However, since the corresponding two state devices 74 and 73 have already been set in their respective 1 states no further outputs will be derived from the gate 76, until the flip-flops 73 and 74 return to the 0 state, and this period is arranged to exceed one cycle period of the counter 59, and may exceed several such periods. However, if the radiation image 68 is produced by radiation received from a proper target it is assumed to be traversing the lattice in the direction shown by the arrow 69. Since the sampling period is so chosen in relation to the velocity at which the radiation image traverses the lattice that, when the second sampling cycle occurs, the radiation image has moved to cover one of the adjacent detectors. In these circumstances a further output is applied to a two-state device, which had not previously been set in the 1 state within the last counter cycle or the last few such cycles. In consequence two or more successive signals having a frequency equal to the cycle frequency of the counter 59 are derived from the gate 76, and the frequency discriminator 70 provides an output signal in response thereto. It will be understood that the embodiment of the radiation detector as shown in FIG. 3 could equally well discriminate between a target image and a spurious image if the former had merely been increasing in area rather than traversing the lattice.

The lattice arrangement of detector cells may also be employed to track the movement of the radiation image across the surface of the lattice as the inclination and range of the target relative to the missile carrying the radiation detector, changes. Thus, the pair of two-state devices which are operated in response to signals generated by the detector cells receiving radiation are indicative of the co-ordinates of the radiation image and the velocity with which the radiation image traverses the lattice can also be determined. With such an arrangement, the criteria for providing an output signal can be made dependent on the radiation image following a prescribed tracking course across the lattice.

In the arrangement illustrated in FIG. 3, it is assumed that the image size on the lattice 57 is such that only one flip-flop is set at any time. If desired, image size discrimination may be combined with movement discrimination so that, by applying the outputs of the horizontal conductors in pairs to two gates as shown in FIG. 2, a flip-flop may be set only by a target exceeding a given size. Moreover, means may be provided to ensure that only the first pulse output of gate 76 in any one cycle of the counter 59 passes to the discriminator 70.

FIG. 4 illustrates two examples of a further type of infra-red detector with their associated optical arrangements which may be used in discriminators according to the invention. As in the previous example the detector discriminates between radiation received from a source at a distance and a proper target on a basis of the respective size of the images formed by the associated optical system. Two separate detectors are shown W and V in the example illustrated in FIG. 4. Each includes a lens system L for focussing the incident radiation at the cylindrical guard cells 12 and 13 and the cylindrical detector cell 10. The axes of these cylinders, shown in FIG. 4, is in the plane of the paper, and substantially at right angles to the lines 21, 22.

The lines 21 and 22 show the limits of the cone of incident radiation from a radiation source at a distance, which subtends an angle denoted by $\alpha$ degrees. In the embodiment of the invention shown in FIG. 4 it is assumed that only the central detector cell receives radiation from such a source whilst radiation from a proper target is incident over an area including the outer guard cells. A number of assemblies such as W and V may be located about the periphery of a missile and in one example six such assemblies are used.

FIG. 5 shows an arrangement which is very similar to that illustrated in FIG. 4, the operation of both arrangements being identical with the exception that a single optical arrangement shown in FIG. 5 focusses incident radiation from all directions round the axis of the lens systems onto a common group of detector cells. This arrangement can only be utilized when the dimensions of the missile are such as to allow the surface of the lens shown in cross-section at Q and R, to be located at the periphery of the body of the missile. As in the example of FIG. 4 the guard cells and the central detector cell are cylindrical.

In both examples of the detectors shown in FIGS. 4 and 5 the lens used have an acceptance angle of $\beta$degrees, where the angle $\beta$ is larger than the angle $\alpha$. This arrangement ensures that a proper target within range produces an image covering the guard cells whereas the image produced by a distant source and within prescribed limits of size is not sufficiently large to cover all the guard cells simultaneously. This criterion can be utilized in a manner similar to that described with reference to FIG. 1, so as to provide a discriminating circuit which inhibits the firing signal due to radiation from a distant source alone but allows the device to operate within a prescribed proximity to the target even in the presence of a signal from a distant source.

FIG. 6 illustrates a further example of an arrangement for discriminating between radiation from a distant source and from a proper target and employs discriminating circuits similar to those used in the arrangements of FIGS. 1*b* and 1*c*. The figure shows a miniature immersed arrangement, comprising two guard cell annuli 40 which are located near the inner surface of a conical shaped body, shown in cross-section in FIG. 6 by the reference 42.

The optical lens 45 is shown in cross-section in FIG. 6, and takes the form of a hemispherically shaped dome and part of the outside surface of this lens is covered by an opaque layer 44. Only the arc 46 remains clear, and since this portion extends round the periphery of the dome shaped lens structure, radiation is incident on the detector system consisting of guard cell annuli 40 and detector annulus 41. Reference to the figure shows that the discrimination is again obtained by virtue of the fact that the focussed image of a distant source only excites the central annular ring of detector cells, whilst the larger image of a prescribed target causes the outer guard cell annuli 40 to be simultaneously excited. In a manner similar to that described with reference to FIG. 1, a logic circuit is employed which inhibits firing due to radiation from a distant source of spurious radiation alone, but provides a firing signal in response to radiation from a prescribed target.

What I claim is:

1. A target discriminating device comprising a plurality of radiation sensitive elements distributed in rows and columns over an image area, means for condensing incident radiation to form an image on said area, a plurality of row conductors corresponding to the rows of said sensitive elements, a plurality of column conductors corresponding to the columns of said sensitive elements, the row conductors being coupled to the column conductors by the sensitive elements in the respective rows and columns, means for sequentially sampling said column conductors to cause a signal to appear selectively in the row conductors in dependence upon the excitation of the said sensitive elements, an output channel common to said row conductors, coupling means including isolating two-state devices, one for each row conductor, arranged to pass a signal from the respective row conductor to the output channel once only within a predetermined time interval and means for additionally applying a signal to said output channel at each sampling instant, other than via the row conductors, in response to excitation of any sensitive element in the respective column, said output channel including means for generating an output signal only in response to a plural number of successively applied discrete signals within said time interval.

2. A target discriminating device comprising a plurality of radiation sensitive elements distributed over an image area, means for condensing incident radiation to form an image on said area, an output channel common to said radiation sensitive elements, coupling means for coupling said radiation sensitive elements to said output channel, said coupling means including isolating means which can be conditioned selectively to enable an excited element to apply or to prevent an excited element from applying a signal to said common channel, said isolating means being responsive to a plurality of said elements to render the condition of said isolating means at any instant dependent upon excitation of respective elements within a predetermined interval of time, thereby to allow an output signal to be produced in said output channel only when at least a predetermined plural number of said elements has been excited in said interval and to prevent an output signal being produced in said channel if a lesser number of said elements has been excited in said interval, and said isolating means comprising a plurality of individual isolating elements coupled to different sensitive elements, each isolating element being arranged to prevent the production of a signal in said output channel when only the respective sensitive element has been excited in the predetermined interval.

* * * * *